(12) United States Patent
Saito et al.

(10) Patent No.: US 6,700,673 B1
(45) Date of Patent: Mar. 2, 2004

(54) IMAGE-READING APPARATUS

(75) Inventors: Takeyasu Saito, Fukuoka (JP);
Hironori Tomooka, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/465,077

(22) Filed: Dec. 16, 1999

(30) Foreign Application Priority Data

Dec. 16, 1998 (JP) .............................. 10-357535

(51) Int. Cl.$^7$ .............................. G06F 3/12; G06K 15/02
(52) U.S. Cl. .................... 358/1.12; 358/403; 358/404
(58) Field of Search .................. 358/1.12, 403, 358/404

(56) References Cited

U.S. PATENT DOCUMENTS

| | | | | |
|---|---|---|---|---|
| 3,913,719 A | * | 10/1975 | Frey | 358/1.16 |
| 4,860,219 A | * | 8/1989 | Schulz et al. | 358/1.17 |
| 5,028,991 A | * | 7/1991 | Sekizawa et al. | 358/537 |
| 5,200,925 A | * | 4/1993 | Morooka | 365/219 |
| 5,774,758 A | * | 6/1998 | Takahashi et al. | 358/296 |
| 5,812,746 A | * | 9/1998 | Mishima et al. | 358/1.14 |
| 5,819,014 A | * | 10/1998 | Cyr et al. | 358/1.15 |
| 5,990,922 A | * | 11/1999 | Lee | 358/3.01 |
| 6,128,095 A | * | 10/2000 | Murata | 358/1.16 |
| 6,249,359 B1 | * | 6/2001 | Aoki et al. | 358/473 |
| 6,370,343 B1 | * | 4/2002 | Watanabe | 399/66 |
| 6,424,428 B1 | * | 7/2002 | Takeuchi | 358/1.16 |

* cited by examiner

*Primary Examiner*—Edward Coles
*Assistant Examiner*—Alan Rahimi
(74) *Attorney, Agent, or Firm*—RatnerPrestia

(57) ABSTRACT

An image-reading apparatus is provided with a plurality of buffer units between an image-reading unit 6c for reading an image on paper P fed one after another consecutively and an interface 8 for outputting an image data to a host computer 9. The image-reading apparatus suspends feeding of the paper P and reading of the image, and stops operation of its own after all of the image data is output from the buffer unit wherein the image data is written, when operation of a scanner is stopped or temporarily suspended. The invention can thus provide the highly reliable image-reading apparatus that is capable of outputting the entire image data it reads from the original paper without losing it, even if the operation is terminated in the midst of a continuous reading.

1 Claim, 4 Drawing Sheets

IMAGE-READING APPARATUS

FIELD OF THE INVENTION

The present invention relates to an image-reading apparatus comprising a combination of an image scanner and a host computer, utilized for an electronic filing system. The present invention also relates to an image-reading apparatus devised to be capable of transferring an image data to a host computer without losing it, even if an intervention is made to stop or suspend temporarily especially while the apparatus is feeding original paper sheets continuously.

BACKGROUND OF THE INVENTION

Image-reading apparatuses provided with scanners for reading images have been in use for a long while as apparatuses to read a variety of original paper sheets in large volume for a purpose of electronic filing. The scanners feed a variety of original paper sheets, read images thereon, and output image data. A system is normally composed for the purpose of storage, control, retrieval, and so on of image data obtained by the scanner, by combining it with a host computer utilizing a personal computer. The system carries out an exchange of information signal between the scanner and the host computer via an interface.

In this kind of combination of a scanner and a host computer, it usually takes a longer time for transferring a read-out image data from an interface to the host computer as compared to a time spent for reading the image in a sheet of original paper. Thus, a processing time for a sheet of original paper is dependent upon the former, i.e. the transferring time. It is effective to provide two buffers immediately before the interface in order to accelerate the processing speed. In other words, it is possible to speed-up the processing, if a writing of read-out image and an output to the host computer are repeated alternately while switching these buffers, so as to absorb a difference between the reading time and the transfer time.

In the case of providing two buffers, a buffer A and a buffer B, data of a original paper sheet, of which an image has been read, is written in one of the buffers, i.e. the buffer A, whereas an image data of another original paper sheet, which has been fed a moment ahead of the original paper sheet being written, is output from the other buffer B to the host computer through the interface. In other words, even though the original paper sheets are read by the image-reading unit one at a time in a feeding order, the read-out data is not transferred immediately. Instead, an image data of the previous original paper sheet is output to the host computer from the other buffer B, while a subsequent original paper sheet is being read and written in the buffer A.

There are occasionally cases with the image-reading apparatus that require processing of a large volume of original paper sheets by feeding them consecutively. The operation is suspended, when original paper sheets loaded on a paper feeder of the scanner are rearranged, when new original paper sheets are additionally loaded, or if a trouble immerges with the apparatus. The suspension takes place when the host computer sends a suspending command, or the suspension can be made with a switch provided on the scanner side for the purpose of a temporary suspension. It is also feasible to temporarily suspend the scanner alone, or to stop operation of the entire system.

However, when a suspension is made in a mode of continuous feeding of the original paper sheets, the apparatus stops while the image data of the original paper sheet fed previously has still not as yet been output completely from the buffer B, even if the operation is suspended at such a point of time that a reading is completed for a original paper sheet whose image is being read. Hence, the image data will be lost.

That is, in the case of providing two buffers, the buffer A and the buffer B, the previously written image data of original paper sheet is output from the buffer B, while another data of original paper sheet is being written in the buffer A. After a completion of the output from the buffer B, an image data of the subsequent original paper sheet is output from the buffer A, and a data of the following original paper sheet is written in the buffer B. Therefore, if the operation stops after a completion of reading the image on the fed original paper sheet, i.e. the completion of writing the image into the buffer A, the other buffer B suspends an output before completing a process of the whole image data.

As described, when the operation is suspended in the mode of continuous feeding of the original paper sheets, the reading of image and the writing it into the buffer are brought into completion so far as the original paper sheet already fed into the image-reading unit is concerned. It is therefore possible to write the entire image data of the original paper sheet into the buffer. However, another buffer, which has already received the image data from the previously fed original paper sheet, is not able to output the entire image data within a time period between the suspending command and the completion of writing the subsequent original paper sheet.

As has been described, the image-reading apparatus of the prior art loses an image data every time the apparatus is suspended of operation, thereby giving rise to a problem of reliability in the image reading.

SUMMARY OF THE INVENTION

A problem to be solved in the present invention is to provide a highly reliable image-reading apparatus capable of outputting entirely an image data that it reads from a original paper sheet without losing it, even if the operation is suspended during a continuous reading.

The present invention relates to an image-reading apparatus for feeding a paper, reading an image on the paper, and outputting the read-out image data to an external apparatus. The image-reading apparatus comprises:

(a) a paper feeder for feeding a stack of papers one after another;

(b) an image-reading unit for reading an image on the paper fed from the paper feeder;

(c) an image data output unit for outputting the read-out image data to the external apparatus;

(d) a plurality of buffer units provided between the image-reading unit and the image data output unit, wherein an image data is written by the image-reading unit, and wherefrom the image data is read and forwarded to the image data output unit; and (e) an operation suspending controller for suspending operation of the paper feeder and the image-reading unit from taking another paper subsequent to a paper under a process of being read, and also for stopping operation of the image-reading apparatus only after the image data output unit outputs all of image data from the buffer unit that contains the image data written already by the image-reading unit, when an operation suspending command is given to the image-reading apparatus.

The foregoing structure can prevent the apparatus from suspending the operation until all of the image data is output from the buffer unit, in which the image data is being written from the paper already in a process of being read, even if the apparatus receives a suspending command, thereby avoiding a loss of the read-out image data.

DETAILED DESCRIPTION OF THE PREFERRED EMBODIMENT

An exemplary embodiment of the present invention will be described hereinafter by referring to the accompanying figures.

Exemplary Embodiment

Figure 1:
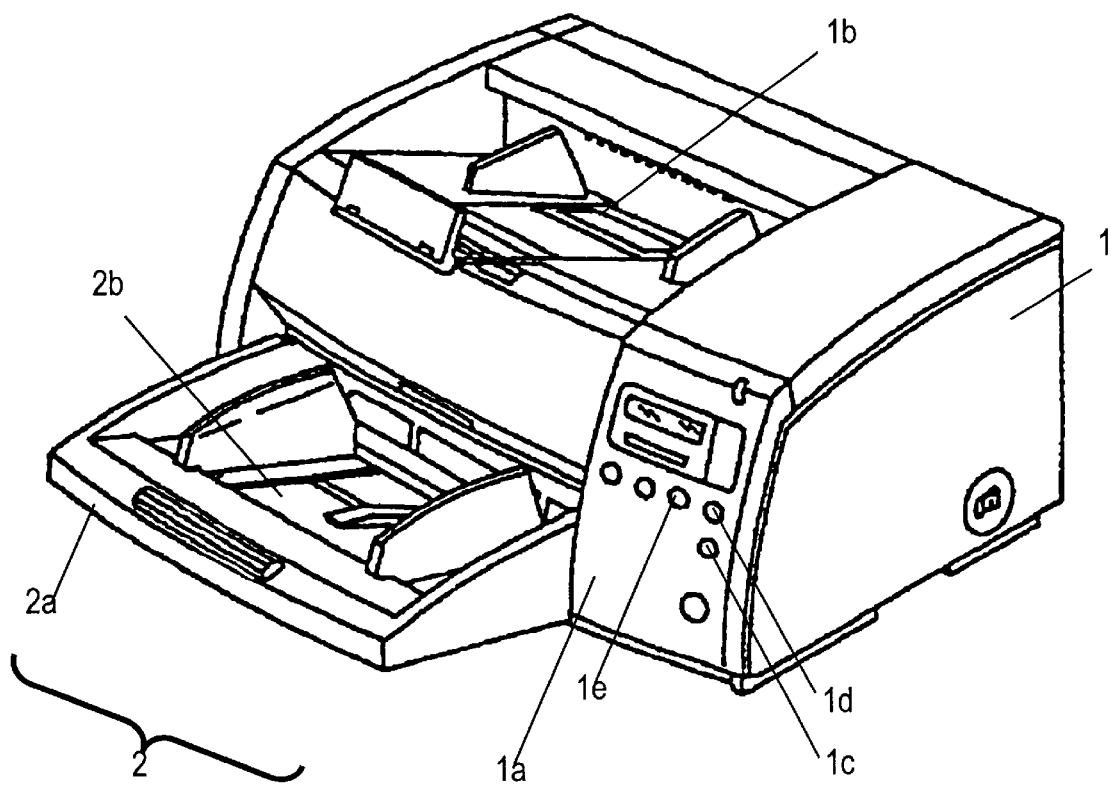
FIG. 1 is a general perspective view depicting an image-reading apparatus of the present invention.

FIG. 1 is a perspective view depicting a general outline of an image-reading apparatus of the present invention.

As shown in the figure, the image-reading apparatus comprises a main body 1 equipped internally with a scanning module utilizing an optical system and a conveyor path for papers, and an automatic paper-feeding mechanism 2. The main body 1 is provided with a control panel 1a on a front surface of it, and a controller (not shown in the figure) in its inside for controlling all devices. The main body 1 is further provided with a recovering tray 1b on an upper surface of it for receiving papers fed from the automatic paper-feeding mechanism 2, and made through with an image-reading. The control panel 1a is provided with a temporary suspension button 1c for stopping a scanner temporarily, a restart button 1d for reactivating the scanner, and a stop button 1e for terminating all operation including a host computer that dictates operation of the scanner.

The automatic paper-feeding mechanism 2 is provided with a function of hopper for carrying papers and sending them out toward the conveyor path in the main body 1, and a function of preventing a multiple feeding of the papers. A diagrammatic view of the automatic paper-feeding mechanism 2, including the conveyor path for papers is shown in FIG. 2.

The automatic paper-feeding mechanism 2 comprises a paper-feeding hopper 2b, which is assembled into a housing 2a (refer to FIG. 1) in such a manner as to be vertically rotatable. The paper-feeding hopper 2b is connected to and driven by a motor (not shown in the figure), so that it is rotated to a position where the paper P comes into contact with a paper-feeding roller (to be discussed later) as shown in FIG. 2, and it is pressed upwardly. In addition, a original paper sheet sensor 2c is provided on a bottom surface of the paper-feeding hopper 2b for determining whether original paper sheet P is loaded.

Figure 2:
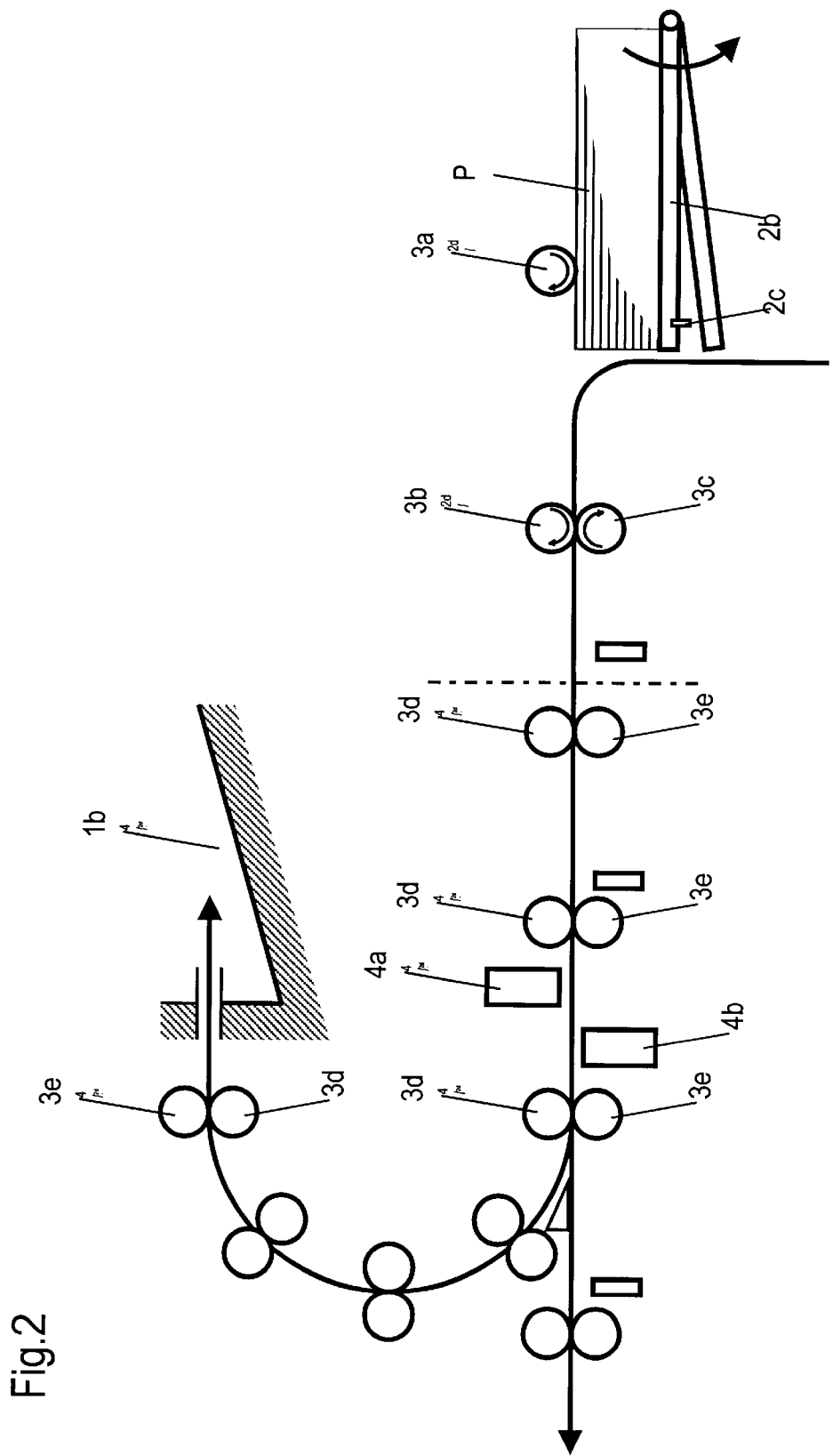
FIG. 2 is a diagrammatic view depicting an automatic paper feeding mechanism from a paper feeding hopper through a conveyor path to a recovering tray.

The automatic paper-feeding mechanism 2 is provided with a paper-feeding roller 3a for sending out the papers P on the paper-feeding hopper 2b by picking them up one after another, a separation roller 3b for preventing a multiple feeding of the paper, and a retard roller 3c containing internally a torque-limiter, as shown in FIG. 2. A paper conveyor path leading to the recovering tray 1b on top of the main body 1 is connected at a downstream of the separation roller 3b and the retard roller 3c. The paper conveyor path is provided with pairs of conveyor rollers 3d and 3e in a plurality of stages. A scanner head 4a and another scanner head 4b are positioned as an image-reading unit between a second stage and a third stage of the conveyor rollers 3d and 3e for reading images. In this connection, the scanner head 4a on the upper side reads an image on a front surface of the paper P forwarded from the paper-feeding hopper 2b, and the scanner head 4b on the lower side reads an image on a back surface of the paper P.

Figure 3:
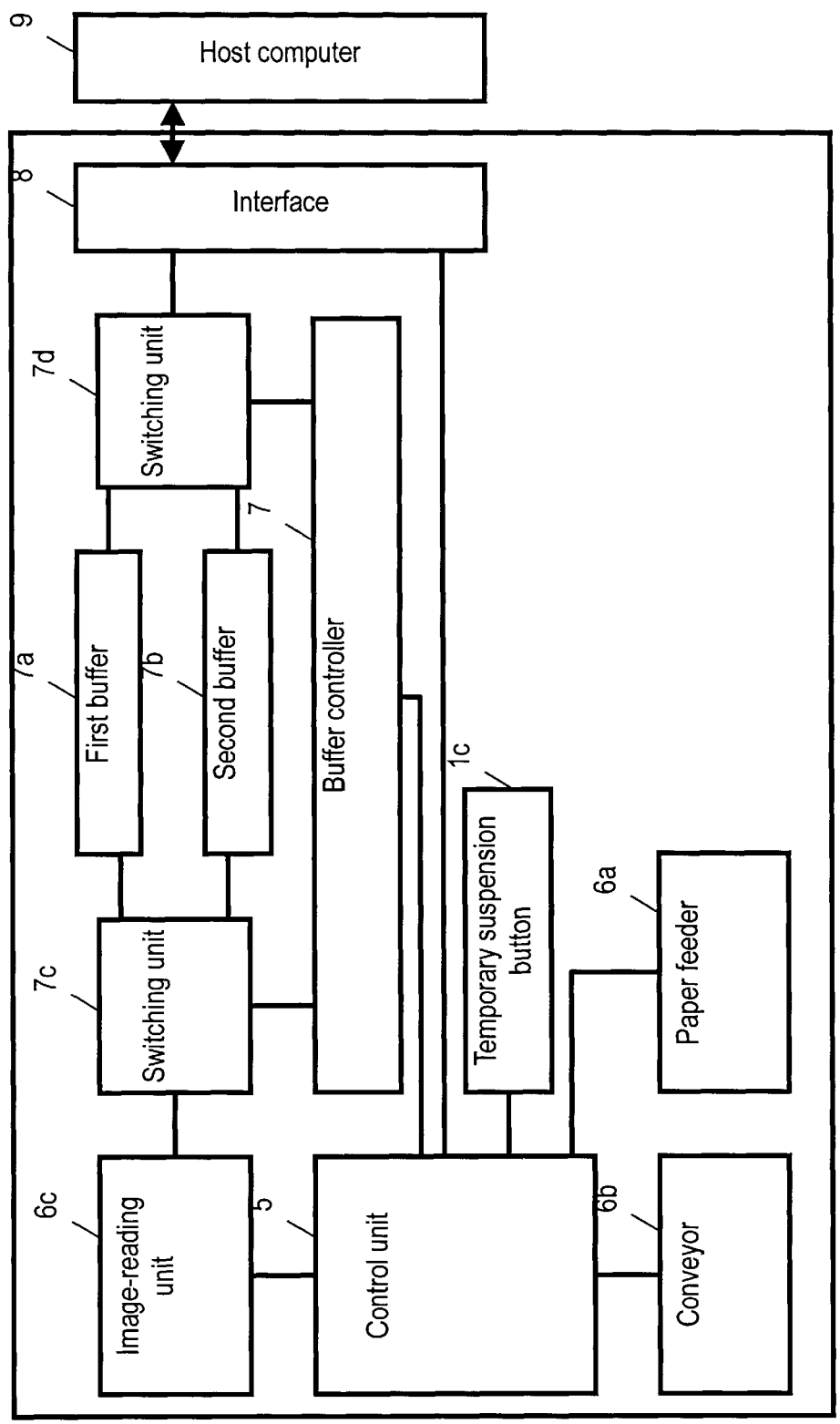
FIG. 3 is a block diagram of a control for conveying original paper sheet, reading image, and transferring image data to a host computer.

FIG. 3 is a block diagram of a control for conveying the paper P, reading an image, and transferring the image data to the host computer.

The control unit 5 controls operation of the image-reading apparatus. The control unit 5 controls an individual function of a paper feeder 6a for feeding original paper sheets, a conveyor 6b for transferring a paper P from the paper feeder 6a to the recovering tray 1b, and an image-reading unit 6c for reading an image on the paper P. In this instance, the paper feeder 6a refers to the structure from the automatic paper-feeding mechanism 2 having the paper-feeding roller 3a to the separation roller 3b and the retard roller 3c. The conveyor 6b refers to the conveyor rollers 3d and 3e arranged in a plurality of stages, and the image-reading unit 6c refers to the scanner heads 4a and 4b.

Furthermore, the control unit 5 outputs a command signal to a buffer controller 7 and an interface 8, which serves as an image data output unit, to transfer an image data to the host computer 9. The buffer controller 7 switches either of a first buffer 7a and a second buffer 7b, in which the image data from the image-reading unit 6c is written, with switching units 7c and 7d.

These switching units 7c and 7d, under the control of the buffer controller 7, connect the first buffer 7a to the image-reading unit 6c side, and the second buffer 7b to the interface 8, so that the image data from the image-reading unit 6c is written in the first buffer 7a, and another image data temporarily stored in the second buffer 7b is sent out to the interface 8 at the same time. Then, in the next step, the switching units 7c and 7d connect the first buffer 7a to the interface 8 side, and the second buffer 7b to the image-reading unit 6c, so the image data is sent out from the first buffer 7a to the interface 8, and another image data from the image-reading unit 6c is written in the second buffer 7b at the same time. By repeating a switching operation in the above manner, a previously stored image data in one of the first and the second buffers 7a and 7b is input to the host computer 9 via the interface 8, while an image data forwarded by the image-reading unit 6c is being written into the other buffer.

A structure of the prior art apparatus has been such that an operation is terminated when a reading is completed from a paper P, if a manipulation is made to stop the apparatus if the paper P has been fed into the image-reading unit 6c and the reading is already being carried out. In terminating the operation in the above manner, there has been a problem that a part of the image data is lost from a buffer, which is in a process of transferring a signal to a host computer 9 via an interface 8, since operation of the buffer is terminated before it can complete outputting the whole data.

On the contrary, the apparatus of the present invention immediately stops feeding of a new paper P and reading of an image, and terminates operation of the buffer only after it outputs the whole image data to the host computer 9, if the buffer has been written already with the image data by the image-reading unit 6c, when the stopping manipulation is made.

Figure 4:
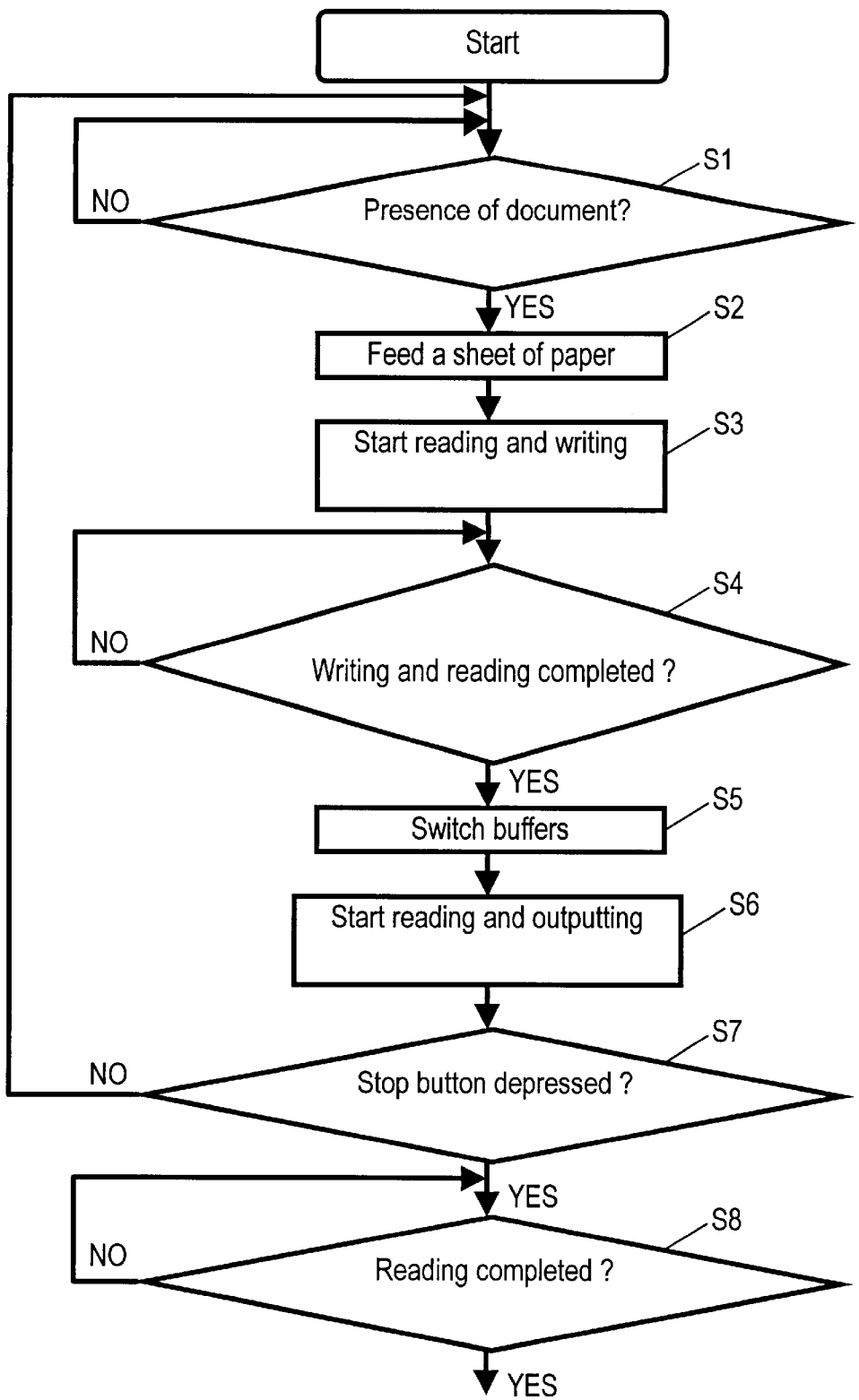
FIG. 4 is a control flowchart of the present invention.

FIG. 4 is a flowchart of the afore-said control, which will be described as an exemplary case in that the temporary suspension button 1c is manipulated.

When the host computer 9 issues a command for starting operation:

S1. the original paper sheet sensor 2c checks whether or not a paper P (original paper sheet) is present on the hopper 2b;

S2. the paper feeder 6a and the conveyor 6b are activated to feed a sheet of paper P from the hopper 2b to the image-reading unit 6c, if a signal denoting the presence of original paper sheet is input;

S3. the image-reading unit 6c reads an image on the paper P, and the read-out image data is written in the first buffer 7a;

S4. wait for completion of both writing the image data into the first buffer 7a, and reading from the second buffer 7b a temporarily stored image data of the previously fed paper P;

S5. upon completion of writing the image data into the first buffer 7a and reading the temporarily stored image data from the second buffer 7b, the switching units 7c and 7d turn the second buffer 7b into a writing side of the image data from the image-reading unit 6c, and the first buffer 7a into a reading side of the image data toward the interface 8, simultaneously;

S6. the image data written in the first buffer 7a in the step S3 is then read, and is output to the host computer 9;

S7. a check is made in this step as to whether or not the temporary stop button 1c has been depressed;

if the temporary stop button 1c has not been depressed, a process is carried out to write an image data on the subsequent paper P into the second buffer 7b after taking the steps S1 and S2, and unless the temporary stop button 1c is not depressed, the first buffer 7a and the second buffer 7b are switched alternately between writing of an image data from the image-reading unit 6c and reading of a temporarily stored image data to the interface 8, from this step forward, and S8. if the temporary stop button 1c has been depressed according to a judgement in the step S7, the operation is suspended after waiting a completion of reading the whole image data from the first buffer 7a, which has begun in the step S6.

Accordingly, the paper feeder 6a and the conveyor 6b are not activated, and feeding of the subsequent paper to the one, of which image has been written in the first buffer 7a, is suspended immediately, if the temporary stop button 1c is depressed. The image data that has been written in the first buffer 7a is then input entirely into the host computer 9 via the interface 8.

As has been described, the apparatus suspends feeding of the subsequent paper P, and stops reading as well as writing of it into the second buffer 7b, if it detects the temporary stop button 1c is depressed. The entire image data in the first buffer 7a for the paper P, which is in the process of being read at a time the temporary stop button 1c is depressed, is read completely. Although the foregoing description has specified the first buffer 7a and the second buffer 7b for the sake of simplicity, the first and the second buffers may be interchangeable, as a matter of course, depending upon a number of papers P to be fed. Hence, the image data written in the first buffer 7a or the second buffer 7b can be input to the host computer 9 without losing any portion of it, thereby causing no defect in the read-out image.

Furthermore, with regard to the subsequent paper following the one, which is under the process of being read at a time the suspension command is given, feeding and reading of this subsequent paper "P" is suspended after the previous paper P under the reading process is read through. After that, the image-reading apparatus stops in it entirety, when output of the image data from the first buffer 7a or the second buffer 7b is completed. Since feeding of the subsequent paper P is suspended, there is never an incomplete reading or writing of data to the buffer side. There is no need to repeat reading again of an incompletely processed paper P, when the image-reading apparatus is restarted.

Although what has been described is an example case, in that the temporary suspension button 1c is manipulated, the same operation takes place if the stop button 1e is depressed, or if the host computer 9 gives out a suspending command.

In the present invention, the image-reading apparatus continues sending an output from the buffer unit, wherein an image data is written, to an external apparatus, and stops the operation only after all the image data is output, even if the image-reading apparatus is caused to stop or suspend temporarily in the midst of a continuous feeding of original papers. Accordingly, the apparatus can avoid a loss of image data, and improve reliability of reading images.

Moreover, after receiving a suspending command, the image-reading apparatus does not execute feeding and reading of a paper subsequent to the one, which is under the process of being read at the time the command is given. Therefore, it can save trouble of repeating the reading for any of papers from the paper feeder, since it simply requires to restart the reading from the next paper in due order.

What is claimed is:

1. An image-reading apparatus for feeding a paper, reading an image on said paper, and outputting the read-out image data to an external apparatus, said image-reading apparatus comprising;
  (a) a paper feeder for feeding a stack of papers one after another;
  (b) an image-reading unit for reading images on the respective papers fed from said paper feeder;
  (c) an image data output unit for outputting said readings to said external apparatus;
  (d) a plurality of buffer units provided between said image-reading unit and said image data output unit, wherein
    i) some of said images are stored in one of said buffer units before forwarded to said image data output unit;
    ii) others of said images are stored in another of said buffer units before forwarded to said image data output unit;
    iii) storage between one and another of said buffer units is switched for each successive one of said respective papers, and
    iv) while one of some of said images are stored in one of said buffer units, one of others of said images are read from another of said buffer units; and
  (e) an operation suspending controller for suspending operation of said paper feeder and stopping storing of one of some of said images in one of said buffer units after
    i) an operation suspending command is given to said image-reading apparatus; and
    ii) all of one of said others of said images have been read from said another of said buffer units.

* * * * *